(12) United States Patent
Tazbaz et al.

(10) Patent No.: US 9,851,759 B2
(45) Date of Patent: Dec. 26, 2017

(54) MULTI-PIVOT HINGE COVER

(71) Applicant: Microsoft Technology Licensing, LLC, Redmond, WA (US)

(72) Inventors: Errol Mark Tazbaz, Bellevue, WA (US); Avi Hecht, Beverly Hills, CA (US); James Alec Ishihara, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/588,138

(22) Filed: Dec. 31, 2014

(65) Prior Publication Data

US 2016/0187935 A1   Jun. 30, 2016

(51) Int. Cl.
| | |
|---|---|
| G06F 1/16 | (2006.01) |
| E05D 3/06 | (2006.01) |
| E05D 15/00 | (2006.01) |
| E05D 15/32 | (2006.01) |
| H04M 1/02 | (2006.01) |

(52) U.S. Cl.
CPC ............ *G06F 1/1681* (2013.01); *G06F 1/163* (2013.01); *G06F 1/1616* (2013.01); *G06F 1/1652* (2013.01); *H04M 1/0216* (2013.01); *H04M 1/022* (2013.01)

(58) Field of Classification Search
CPC .... G06F 1/1681; G06F 1/1652; G06F 1/1637; G06F 1/1616; G06F 1/1601; G06F 1/163
USPC .............. 361/679.04, 679.26, 679.27, 679.3, 361/679.55, 679.56; 16/282, 287, 288, 16/302, 366–370
See application file for complete search history.

(56) References Cited

U.S. PATENT DOCUMENTS

| | | | |
|---|---|---|---|
| 4,355,666 | A | 10/1982 | Torii |
| 4,611,710 | A | 9/1986 | Mitsufuji |
| 4,711,046 | A | 12/1987 | Herrgord |
| 5,056,192 | A | 10/1991 | Grass |
| 5,229,921 | A | 7/1993 | Bohmer |
| 5,456,195 | A | 10/1995 | Ozaku et al. |
| 5,509,590 | A | 4/1996 | Medeiros, Jr. |
| 5,796,575 | A | 8/1998 | Podwalny et al. |
| 5,845,366 | A | 12/1998 | Kuroda |
| 5,987,704 | A | 11/1999 | Tang |
| 6,223,393 | B1 | 5/2001 | Knopf |
| 6,421,235 | B2 | 7/2002 | Ditzik |
| 6,470,532 | B2 | 10/2002 | Rude |

(Continued)

FOREIGN PATENT DOCUMENTS

| | | |
|---|---|---|
| CN | 203669484 U | 6/2014 |
| CN | 204553530 U | 8/2015 |

(Continued)

OTHER PUBLICATIONS

"Finger Protecta", Published on: Jul. 3, 2011, Available at: http://shop.stormflame.com/finger-protecta-142-p.asp.

(Continued)

*Primary Examiner* — Nidhi Thaker
(74) *Attorney, Agent, or Firm* — Rainier Patents, P.S.

(57) ABSTRACT

The description relates to devices, such as computing devices that have hinged portions. One example can include a first portion and a second portion. This example can also include a flexible multi-pivot hinge cover assembly rotatably securing the first and second portions.

20 Claims, 11 Drawing Sheets

(56) References Cited

U.S. PATENT DOCUMENTS

| | | | |
|---|---|---|---|
| 6,505,382 B1 | 1/2003 | Lam et al. | |
| 6,527,036 B1 | 3/2003 | Welsh | |
| 6,754,081 B2 | 6/2004 | Rude et al. | |
| 6,757,160 B2 | 6/2004 | Moore et al. | |
| 6,831,229 B1 | 12/2004 | Maatta et al. | |
| 6,952,861 B2 | 10/2005 | Ynosencia | |
| 6,966,435 B2 | 11/2005 | Weiser et al. | |
| 7,140,074 B2 | 11/2006 | Han et al. | |
| 7,227,741 B2 | 6/2007 | Garel et al. | |
| 7,251,129 B2 | 7/2007 | Lee et al. | |
| 7,293,380 B2 | 11/2007 | Repecki | |
| 7,418,766 B2 | 9/2008 | Nelson et al. | |
| 7,520,025 B2 | 4/2009 | Hung | |
| 7,584,524 B2 | 9/2009 | Hung | |
| 7,636,985 B2 | 12/2009 | Greenbank | |
| 8,024,843 B2 | 9/2011 | Endo et al. | |
| 8,122,970 B2 | 2/2012 | Palen | |
| 8,441,791 B2 | 5/2013 | Bohn et al. | |
| 8,467,838 B2 | 6/2013 | Griffin et al. | |
| 8,590,857 B2 * | 11/2013 | Chen | H05K 5/0217 24/3.1 |
| 8,624,844 B2 | 1/2014 | Behar et al. | |
| 8,649,166 B2 | 2/2014 | Wu | |
| 8,687,359 B2 | 4/2014 | Theobald et al. | |
| 8,713,759 B2 | 5/2014 | Cai | |
| 8,743,538 B2 | 6/2014 | Ashcraft et al. | |
| 8,796,524 B1 | 8/2014 | Deck | |
| 8,797,727 B2 | 8/2014 | Ashcraft et al. | |
| 8,804,324 B2 | 8/2014 | Bohn et al. | |
| 8,843,183 B2 | 9/2014 | Griffin et al. | |
| 8,851,372 B2 * | 10/2014 | Zhou | G06F 1/163 235/380 |
| 8,854,834 B2 | 10/2014 | O'Connor et al. | |
| 9,047,055 B2 * | 6/2015 | Song | E05D 3/14 |
| 9,243,432 B2 * | 1/2016 | Lee | E05D 3/06 |
| 9,411,365 B1 | 8/2016 | Tanner et al. | |
| 9,625,947 B2 | 4/2017 | Lee et al. | |
| 2004/0091101 A1 | 5/2004 | Park et al. | |
| 2005/0122671 A1 | 6/2005 | Homer | |
| 2006/0079277 A1 | 4/2006 | Ditzik | |
| 2007/0039132 A1 | 2/2007 | Jung et al. | |
| 2007/0049376 A1 | 3/2007 | Cho et al. | |
| 2007/0107163 A1 | 5/2007 | Barnett | |
| 2007/0117600 A1 | 5/2007 | Robertson et al. | |
| 2007/0247799 A1 * | 10/2007 | Nie | G06F 1/1616 361/679.55 |
| 2008/0174089 A1 | 7/2008 | Ekberg | |
| 2009/0147458 A1 | 6/2009 | Wang et al. | |
| 2010/0154171 A1 | 6/2010 | Lombardi et al. | |
| 2010/0232100 A1 * | 9/2010 | Fukuma | F16G 13/18 361/679.01 |
| 2011/0000136 A1 | 1/2011 | Brun | |
| 2011/0177850 A1 | 7/2011 | Griffin et al. | |
| 2011/0292605 A1 | 12/2011 | Chen | |
| 2012/0147542 A1 * | 6/2012 | Kim | G06F 1/1601 361/679.28 |
| 2012/0272481 A1 | 11/2012 | Ahn et al. | |
| 2012/0279014 A1 | 11/2012 | Carlsson | |
| 2013/0014346 A1 | 1/2013 | Ahn et al. | |
| 2013/0081229 A1 | 4/2013 | Hirano | |
| 2013/0135809 A1 | 5/2013 | Uchiyama et al. | |
| 2013/0139355 A1 | 6/2013 | Lee et al. | |
| 2013/0152342 A1 | 6/2013 | Ahn | |
| 2013/0216740 A1 | 8/2013 | Russell-Clarke | |
| 2013/0219663 A1 * | 8/2013 | Cai | G06F 1/1681 16/371 |
| 2014/0084772 A1 | 3/2014 | Zhang et al. | |
| 2014/0111954 A1 | 4/2014 | Lee et al. | |
| 2014/0160055 A1 | 6/2014 | Margolis et al. | |
| 2014/0174227 A1 | 6/2014 | Hsu | |
| 2014/0196253 A1 | 7/2014 | Song | |
| 2014/0196254 A1 | 7/2014 | Song | |
| 2014/0217875 A1 | 8/2014 | Park | |
| 2014/0226275 A1 * | 8/2014 | Ko | G06F 1/1626 361/679.27 |
| 2014/0239065 A1 | 8/2014 | Zhou et al. | |
| 2014/0245569 A1 | 9/2014 | Cho | |
| 2014/0352757 A1 | 12/2014 | Ramirez | |
| 2015/0092331 A1 | 4/2015 | Kinoshita et al. | |
| 2015/0138103 A1 * | 5/2015 | Nishi | G02F 1/13452 345/173 |
| 2015/0138712 A1 * | 5/2015 | Solland | G06F 1/1652 361/679.27 |
| 2015/0176317 A1 | 6/2015 | Lee | |
| 2015/0277506 A1 | 10/2015 | Cheah | |
| 2015/0361696 A1 | 12/2015 | Tazbaz | |
| 2015/0362956 A1 | 12/2015 | Tazbaz | |
| 2015/0370287 A1 * | 12/2015 | Ko | G06F 1/1626 361/749 |
| 2016/0132075 A1 | 5/2016 | Tazbaz | |
| 2016/0132076 A1 | 5/2016 | Bitz et al. | |
| 2016/0139639 A1 | 5/2016 | Dash et al. | |
| 2016/0147267 A1 | 5/2016 | Campbell et al. | |
| 2016/0215541 A1 | 7/2016 | Tazbaz et al. | |
| 2016/0357226 A1 | 12/2016 | Campbell et al. | |
| 2017/0090523 A1 | 3/2017 | Tazbaz et al. | |

FOREIGN PATENT DOCUMENTS

| | | |
|---|---|---|
| EP | 0844357 A1 | 5/1998 |
| EP | 1340879 A2 | 9/2003 |
| EP | 1464784 A1 | 10/2004 |
| EP | 2765478 A2 | 8/2014 |
| EP | 2765479 A2 | 8/2014 |
| KR | 20140049911 A * | 4/2014 |
| WO | 2016/077254 A1 | 5/2016 |

OTHER PUBLICATIONS

"Polyprop Boxes Accessories", Published on: Jun. 28, 2013, Available at: http://www.presentingbinders.co.uk/Polyprop_Boxes_Accessories.html.

"Samet SoftCover hinge wins the Innovation Award 2013", Published on: Feb. 8, 2013, Available at: http://www.kozsusanidesign.com/samet-softcover-hinge-wins-the-innovation-award-2013/.

"Fingersafe", Published on: May 26, 2013, Available at: http://fingersafe.com/.

"Bi-Fold Hinges", published May 9, 2012, retrieved at <<http://catalog.monroehinge.com/category/bi-fold-hinges>>, 1 page.

"Laptop Back Covers Shell for Dell 15R 5520 7520 M521R 5525 PN T87MC Laptop Hinge Cover", retrieved on Sep. 8, 2014, at <<http://www.alibaba.com/product-detail/Laptop-back-covers-shell-For-Dell_1628979107.html>>, 3 pages.

"Moving Point Hinge-Multipivot Hinge", retrieved on Oct. 9, 2014, at <<http://websystem.gismo.se/Gismo/files/1029/2.mph%2001%20introduktion.pdf>>, 6 pages.

"Multi-function stainless steel hydraulic shower door pivot hinge", retrieved on Sep. 10, 2015, at <<http://www.alibaba.com/product-detail/Multi-function-stainless-steel-hydraulic-shower_60153561047.html>>10 pages.

"Plastic Slatband Chains", retrieved on Sep. 10, 2015, at <<http://www.irp.co.za/wp-content/assets/LFC002-7.5-Straight-Running-Double-Hinge-Chain.pdf>>, 1 page.

"Single and double hinge type LBP (820 & 821 LBP)", retrieved on Sep. 10, 2015, at <<http://www.papadopoulos-bros.gr/en/proionta/erpystries-metaforikes-tainies/erpystries/plastikes/eutheias/monou-kai-diplou-mentese-typou-lbp-820-821-lbp/>>, 1 page.

"Straight Running Chains", published Jul. 15, 2013, retrieved at <<http://www.ultraplastindia.com/stainless-steel-slat-chains.html>>, 2 pages.

"System Plast LF 820 K400 Acetal Straight Running Chain, 4 Width, 120" Length, Single Hinge", retrieved on Sep. 10, 2015, at <<http://www.amazon.com/System-Plast-Acetal-Straight-Running/dp/B00MJXUDIA>>, 3 pages.

Elliott, Amy-Mae, "9 Nifty Laptop Feet to Keep Your PC Running Cool", published on Jul. 30, 2012, retrieved at <<http://mashable.com/2012/07/30/laptop-feet/>>, 26 pages.

(56) References Cited

OTHER PUBLICATIONS

Non-Final Office Action mailed Feb. 22, 2016 from U.S. Appl. No. 14/538,775, 23 pages.
International Search Report mailed Jan. 4, 2016 from PCT Patent Application No. PCT/US2015/059798, 13 pages.
Non-Final Office Action mailed Dec. 10, 2015 from U.S. Appl. No. 14/606,979, 20 pages.
International Search Report mailed Jan. 25, 2016 from PCT Patent Application No. PCT/US2015/060959, 11 pages.
International Search Report mailed Jan. 4, 2016 from PCT Patent Application No. PCT/US2015/059799, 13 pages.
International Search Report and Written Opinion mailed Feb. 22, 2016 from PCT Patent Application No. PCT/US2015/064173, 13 pages.
Response filed Mar. 3, 2016 to the Non-Final Office Action mailed Dec. 10, 2015 from U.S. Appl. No. 14/606,979, 16 pages.
Non-Final Office Action mailed Mar. 31, 2016 from U.S. Appl. No. 14/538,786, 16 pages.
Response filed Jun. 29, 2016 to the Non-Final Office Action mailed Feb. 22, 2016 from U.S. Appl. No. 14/538,775, 12 pages.
Response filed Jun. 29, 2016 to the Non-Final Office Action mailed Apr. 12, 2016 from U.S. Appl. No. 14/555,184, 10 pages.
Response filed Jun. 30, 2016 to the Non-Final Office Action mailed Mar. 31, 2016 from U.S. Appl. No. 14/538,786, 12 pages.
Response and Demand filed Jun. 15, 2016 from from PCT Patent Application No. PCT/US2015/064173, 13 pages.
International Search Report and Written Opinion mailed Apr. 12, 2016 from PCT Patent Application No. PCT/US2016/013815, 19 pages.
Non-Final Office Action mailed Apr. 12, 2016 from U.S. Appl. No. 14/555,184, 32 pages.
Article 34 Demand mailed May 4, 2016 from PCT Patent Application No. PCT/US2015/059798, 17 pages.
Final Office Action mailed Jun. 1, 2016 from U.S. Appl. No. 14/606,979, 48 pages.
Article 34 Demand mailed Jun. 8, 2016 from PCT Patent Application No. PCT/US2015/060959, 14 pages.
Final Office Action and Examiner-Initiated Interview Summary mailed Mar. 15, 2017 from U.S. Appl. No. 14/606,979, 56 pages.
International Preliminary Report on Patentability mailed Mar. 3, 2017 from PCT Patent Application No. PCT/US2015/060959, 7 pages.
Corrected Notice of Allowability mailed Mar. 16, 2017 from U.S. Appl. No. 14/555,184, 8 pages.
Response filed Apr. 20, 2017 to the Non-Final Office Action mailed Feb. 24, 2017 from U.S. Appl. No. 14/538,775, 9 pages.
Corrected Notice of Allowability mailed Mar. 21, 2017 from U.S. Appl. No. 14/538,786, 10 pages.
Response filed Mar. 29, 2017 to the Non-Final Office Action mailed Jan. 6, 2017 from U.S. Appl. No. 14/866,697, 10 pages.
Response filed Jan. 3, 2017 to the Final Office Action mailed Oct. 14, 2016 from U.S. Appl. No. 14/538,775, 9 pages.
Non-Final Office Action mailed Jan. 6, 2017 from U.S. Appl. No. 14/866,697, 72 pages.
Second Written Opinion mailed Jan. 2, 2017 from PCT Patent Application No. PCT/US2016/013815, 6 pages.
Corrected Notice of Allowability mailed Jan. 13, 2017 from U.S. Appl. No. 14/538,786, 26 pages.
Notice of Allowance mailed Feb. 3, 2017 from U.S. Appl. No. 14/555,184, 18 pages.
International Preliminary Report on Patentability mailed Jan. 24, 2017 from PCT Patent Application No. PCT/US2015/059799, 8 pages.
International Preliminary Report on Patentability mailed Jan. 30, 2017 from PCT Patent Application No. PCT/US2015/059798, 6 pages.
Final Office Action mailed Feb. 24, 2017 from U.S. Appl. No. 14/538,775, 42 pages.
Corrected Notice of Allowability mailed Jan. 25, 2017 from U.S. Appl. No. 14/538,786, 6 pages.
Response filed Nov. 28, 2016 to the Written Opinion mailed Apr. 12, 2016 from PCT Patent Application No. PCT/US2016/013815, 10 pages.
Corrected Notice of Allowability mailed Nov. 21, 2016 from U.S. Appl. No. 14/555,184, 6 pages.
Response filed Dec. 8, 2016 to the Second Written Opinion mailed Oct. 31, 2016 from PCT Patent Application No. PCT/US2015/059799, 12 pages.
International Search Report and Written Opinion mailed Nov. 14, 2016 from PCT Patent Application No. PCT/US2016/048898, 16 pages.
International Preliminary Report on Patentability mailed Nov. 29, 2016 from PCT Patent Application No. PCT/US2015/064173, 6 pages.
Response filed Dec. 7, 2016 to the Second Written Opinion mailed Oct. 10, 2016 from PCT Patent Application No. PCT/US2015/060959, 8 pages.
Response filed Dec. 13, 2016 to the Non-Final Office Action mailed Sep. 22, 2016 from U.S. Appl. No. 14/606,979, 22 pages.
Supplemental Response filed Dec. 8, 2016 to the Response filed Jun. 30, 2016 from U.S. Appl. No. 14/538,786, 8 pages.
Applicant-Initiated Interview Summary mailed Dec. 20, 2016 from U.S. Appl. No. 14/538,775, 3 pages.
Corrected Notice of Allowability mailed Dec. 14, 2016 from U.S. Appl. No. 14/555,184, 6 pages.
Amended claims filed Dec. 22, 2016 from PCT Patent Application No. PCT/US2015/059798, 6 pages.
Notice of Allowance mailed Dec. 27, 2016 from U.S. Appl. No. 14/538,786, 54 pages.
Second Written Opinion mailed Oct. 31, 2016 from PCT Patent Application No. PCT/US2015/059799, 8 pages.
Final Office Action mailed Oct. 14, 2016 from U.S. Appl. No. 14/538,775, 63 pages.
Response filed Aug. 26, 2016 to the Final Office Action mailed Jun. 1, 2016 from U.S. Appl. No. 14/606,979, 15 pages.
Applicant-Initiated Interview Summary mailed Aug. 29, 2016 from U.S. Appl. No. 14/606,979, 3 pages.
Non-Final Office Action and Examiner Initiated Interview Summary mailed Sep. 22, 2016 from U.S. Appl. No. 14/606,979, 27 pages.
Interview Summary filed Oct. 11, 2016 from U.S. Appl. No. 14/606,979, 2 pages.
Notice of Allowance mailed Jul. 14, 2016 from U.S. Appl. No. 14/555,184, 15 pages.
Corrected Notice of Allowability mailed Aug. 4, 2016 from U.S. Appl. No. 14/555,184, 16 pages.
Notice of Allowability mailed Oct. 24, 2016 from U.S. Appl. No. 14/555,184, 11 pages.
Corrected Notice of Allowability mailed Oct. 31, 2016 from U.S. Appl. No. 14/555,184, 6 pages.
Second Written Opinion mailed Oct. 10, 2016 from PCT Patent Application No. PCT/US2015/060959, 7 pages.
Preliminary Amendment filed Sep. 26, 2016 from U.S. Appl. No. 15/239,417, 7 pages.
Response and Demand filed Apr. 6, 2016 from PCT Patent Application No. PCT/US2015/059799, 20 pages.
International Preliminary Report on Patentability dated Apr. 4, 2017 from PCT Patent Application No. PCT/US2016/013815, 9 pages.
Non-Final Office Action dated May 25, 2017 from U.S. Appl. No. 15/239,417, 71 pages.
Communication pursuant to Rules 161(1) and 162 EPC dated Jun. 21, 2017 from European Patent Application No. 15797752.1, 2 pages.
Communication pursuant to Rules 161(1) and 162 EPC dated Jun. 21, 2017 from European Patent Application No. 15797753.9, 2 pages.
Article 34 Amendment filed Jun. 14, 2017 from Korean Patent Application No. 10-2017-7015834, 10 pages. (No English Translation).
Demand filed Jun. 7, 2017 with Response to the International Search Report and Written Opinion dated Nov. 14, 2016 from PCT Patent Application No. PCT/US2016/048898, 14 pages.
Notice of Allowance dated Jul. 10, 2017 from U.S. Appl. No. 14/538,775, 19 pages.

(56) References Cited

OTHER PUBLICATIONS

Response filed Jul. 20, 2017 to the Communication pursuant to Rules 161(1) and 162 EPC dated Jun. 21, 2017 from European Patent Application No. 15797752.1, 6 pages.
Final Office Action dated Jul. 19, 2017 from U.S. Appl. No. 14/866,697, 40 pages.
Communication pursuant to Rules 161(1) and 162 EPC dated Aug. 8, 2017 from European Patent Application No. 15816331.1, 2 pages.
Article 34 Amendment filed Aug. 1, 2017 from Korean Patent Application No. 10-2017-7021309, 36 pages. (No English Translation).
Response filed Aug. 15, 2017 to the Final Office Action dated Mar. 15, 2017 from U.S. Appl. No. 14/606,979, 12 pages.
Applicant-Initiated Interview Summary dated Aug. 15, 2017 from U.S. Appl. No. 15/239,417, 3 pages.
Response filed Aug. 23, 2017 to the Non-Final Office Action dated May 25, 2017 from U.S. Appl. No. 15/239,417, 9 pages.
Communication pursuant to Rules 161(1) and 162 EPC dated Jul. 4, 2017 from European Patent Application No. 15801625.3, 2 pages.
Second Written Opinion dated Aug. 1, 2017 from PCT Patent Application No. PCT/US2016/048898, 9 pages.
Notice of Allowance dated Sep. 12, 2017 from U.S. Appl. No. 15/239,417, 20 pages.
Corrected Notice of Allowability dated Sep. 26, 2017 from U.S. Appl. No. 15/239,417, 12 pages.
Response filed Sep. 13, 2017 to the Final Office Action dated Jul. 19, 2017 from U.S. Appl. No. 14/866,697, 11 pages.
Applicant Initiated Interview Summary dated Sep. 18, 2017 from U.S. Appl. No. 14/866,697, 3 pages.
Notice of Allowance dated Sep. 26, 2017 from U.S. Appl. No. 14/866,697, 13 pages.

\* cited by examiner

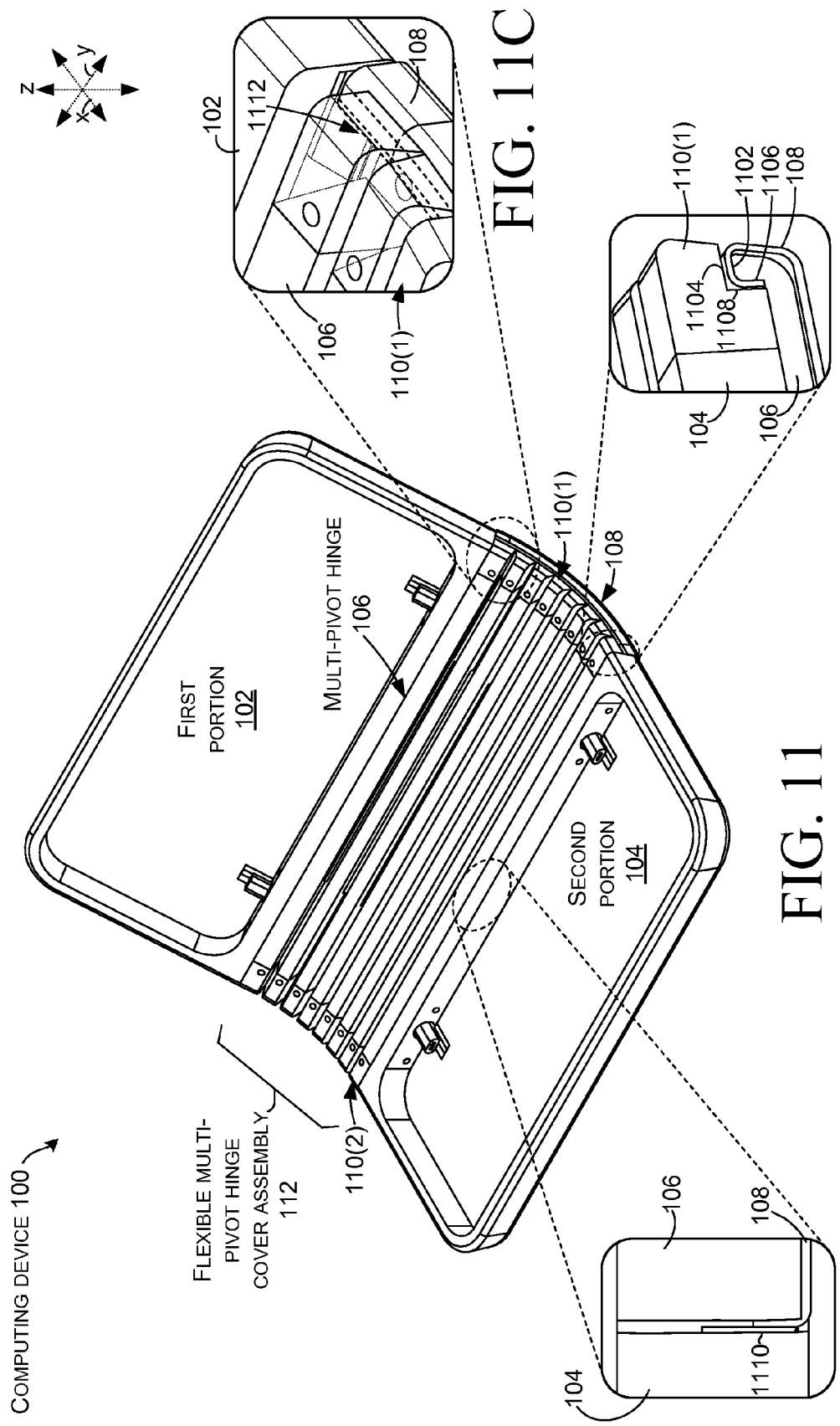

MULTI-PIVOT HINGE COVER

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

FIGS. 6-11C show an example of an assembly process for the example device of FIG. 1 in accordance with some implementations of the present concepts.

DESCRIPTION

The present concepts relate to flexible multi-pivot hinge covers for multi-pivot or multi-axis hinges. Computing devices can employ multi-pivot hinges to rotatably secure portions of the computing device. The present concepts can provide flexible multi-pivot hinge covers over the multi-pivot hinges to protect the hinges from foreign objects and/or protect a user of the computing device from being pinched by the multi-pivot hinges during rotation.

Figure 1:
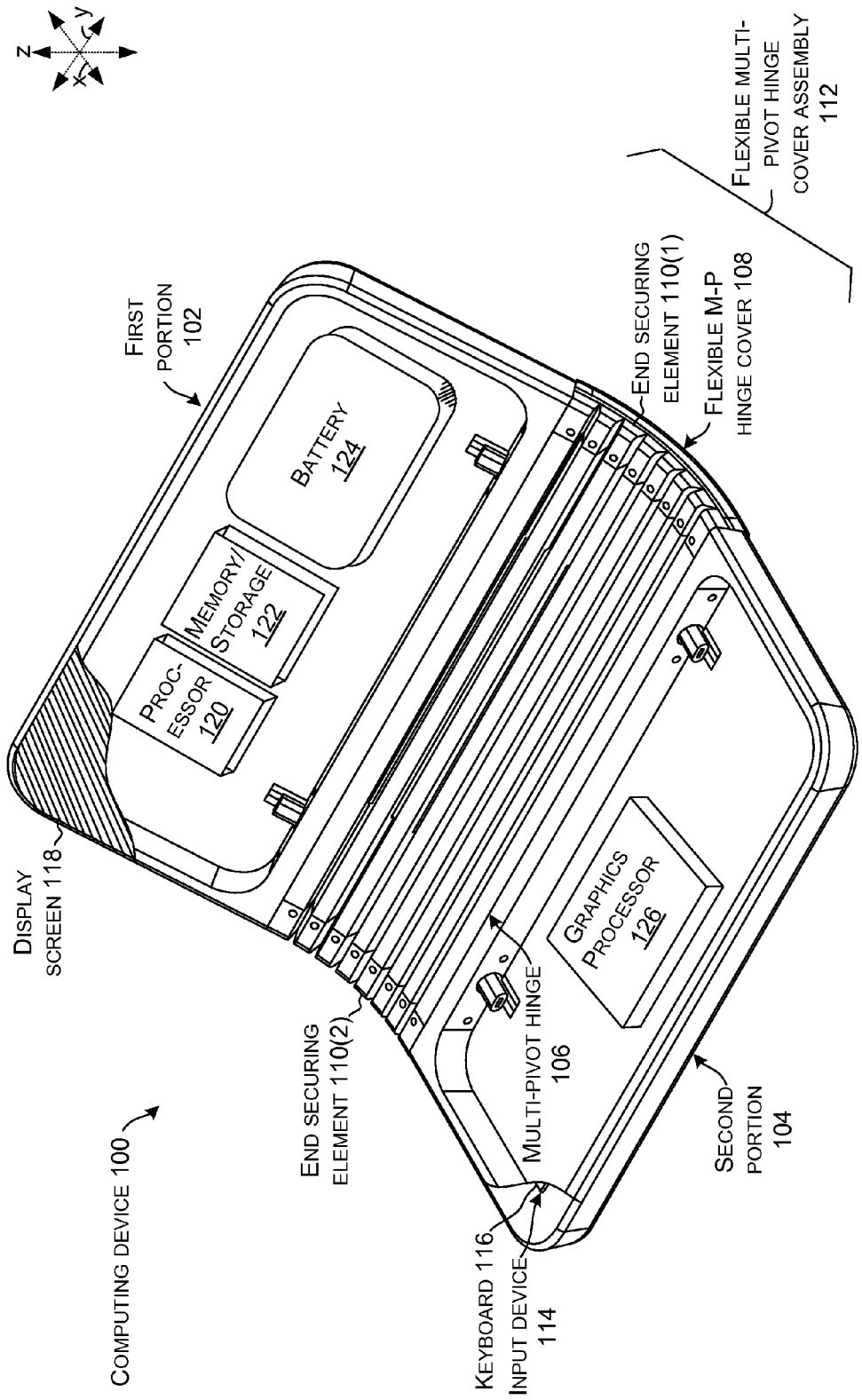
FIG. 1 shows a perspective view of an example device that includes a flexible multi-pivot hinge cover assembly example in accordance with some implementations of the present concepts.
Figure 2:
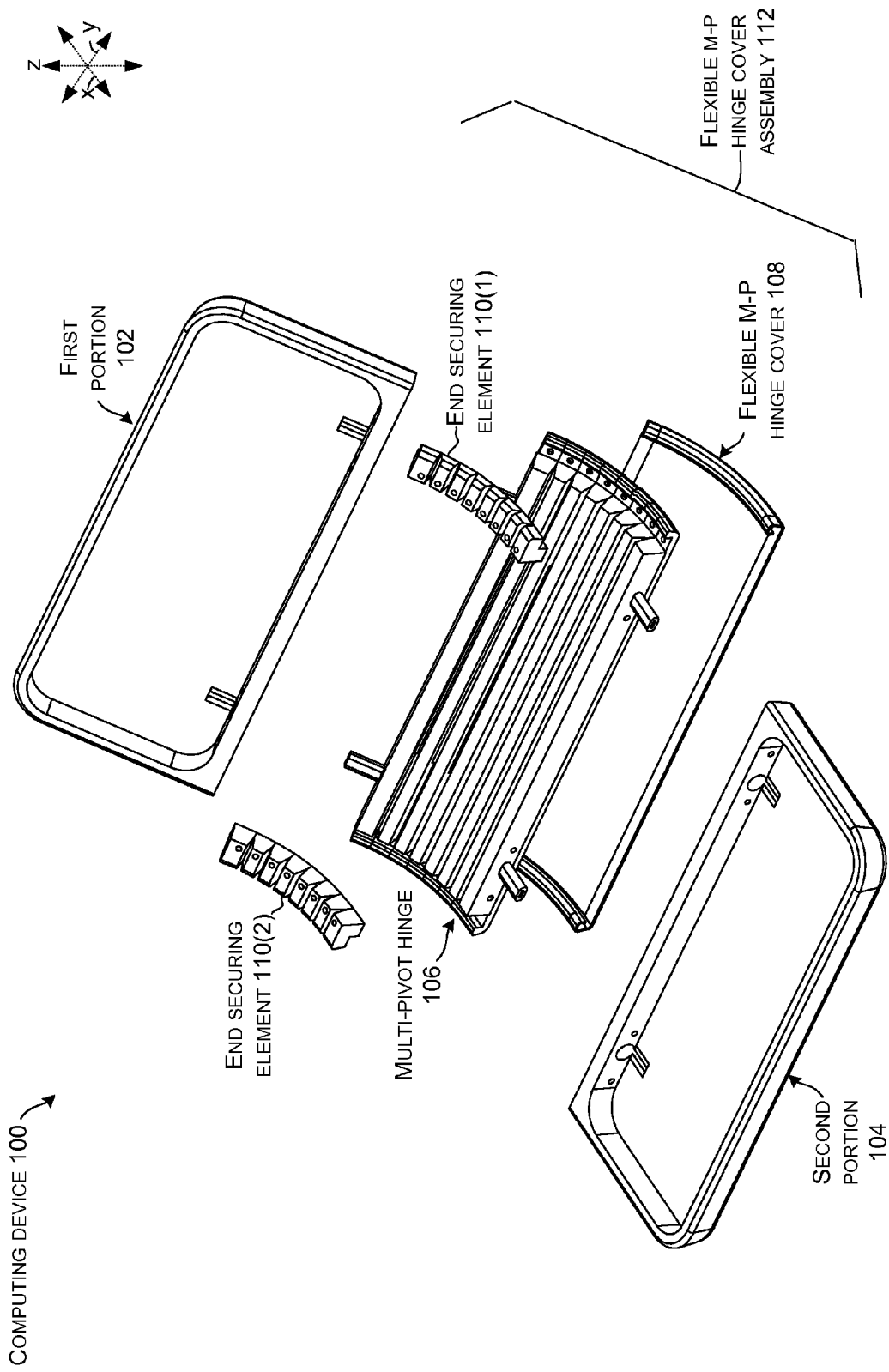
FIG. 2 shows an exploded perspective view of the example device of FIG. 1.

Introductory FIGS. 1 and 2 collectively show an example of a computing device 100. FIG. 2 is an exploded view of the computing device from a similar perspective as FIG. 1. In this example, computing device 100 has first and second portions 102 and 104 that are rotatably secured together by a multi-pivot hinge 106. A flexible multi-pivot hinge cover 108 can extend from the first portion 102 to the second portion 104 to cover the multi-pivot hinge 106.

In this case, the flexible multi-pivot hinge cover 108 covers the 'backside' or 'outside' (e.g., facing away from the reader) of the computing device 100. In other cases, the flexible multi-pivot hinge cover 108 can cover the inside surface or both the inside and outside surfaces. In this implementation the flexible multi-pivot hinge cover 108 can be secured to the multi-pivot hinge 106 by opposing end securing elements 110(1) and 110(2). In this case, the end securing elements 110 can mimic a profile of the multi-pivot hinge 106 to appear generally continuous along the width of the computer (e.g., in the y reference direction). The multi-pivot hinge 106, the flexible multi-pivot hinge cover 108, and/or securing elements, such as end securing elements 110, can be thought of as a flexible multi-pivot hinge cover assembly 112.

As shown in FIG. 1, in various configurations, computing device 100 can also include an input element or device 114. In this case the input device 114 is manifest as a keyboard 116. Other implementations can employ other input devices. In this example, the computing device can also include a display screen 118, such as a touch sensitive display screen. The computing device can also include a processor 120, memory/storage 122, a battery 124, and/or a graphics processor 126, among other components. These elements can be positioned in the first portion 102 and/or second portion 104. (Components 114-126 are not shown in FIG. 2).

Flexible multi-pivot hinge cover assembly 112 can be secured to the first and second portions 102 and 104 to allow rotation therebetween. The flexible multi-pivot hinge cover assembly 112 can be secured to the first and second portions in a relatively permanent manner (e.g., in a manner that is not intended to be readily separable by an end use consumer), such as illustrated in FIGS. 1-2. Alternatively, the flexible multi-pivot hinge cover assembly 112 can be secured to the first and second portions in a relatively quickly attachable/detachable manner (e.g., in a manner that is intended to be readily separable by the end use consumer). One such example of this latter configuration is shown in FIG. 3.

Figure 3:
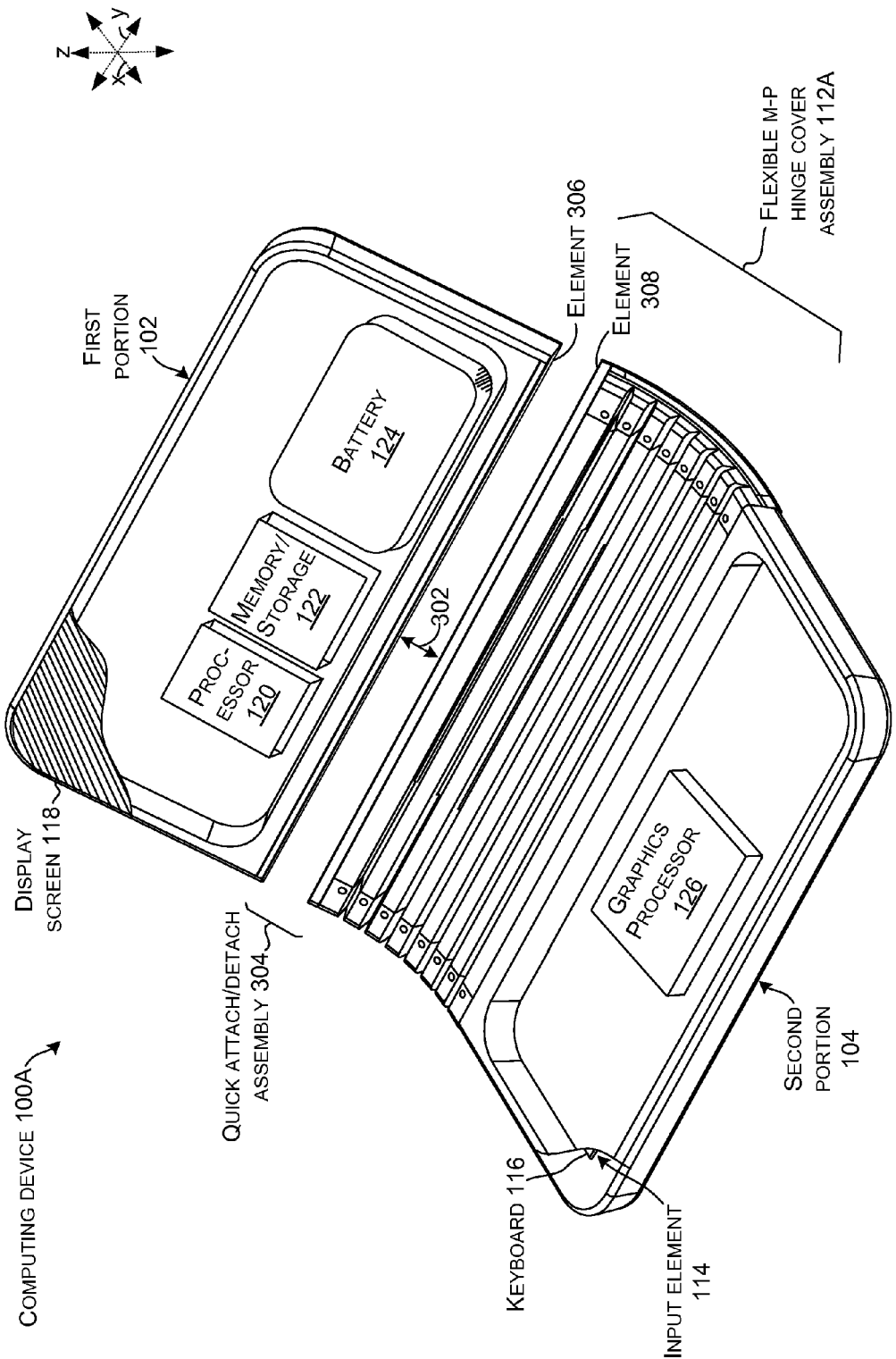
FIG. 3 shows a perspective view of another example device that includes a flexible multi-pivot hinge cover assembly example in accordance with some implementations of the present concepts.

FIG. 3 shows a view that is similar to the view of FIG. 1. In this case, computing device 100A includes first and second portions 102 and 104 that are rotatably secured by flexible multi-pivot hinge cover assembly 112A. In this example, the flexible multi-pivot hinge cover assembly 112A is configured to allow an end use consumer to easily detach either or both of the first and second portions 102 and 104 from the flexible multi-pivot hinge cover assembly 112A as indicated by arrow 302. In this example the flexible multi-pivot hinge cover assembly 112A can include a quick attach/detach assembly 304. The quick attach/detach assembly 304 may include cooperatively operating elements or interfaces 306 and 308 located on the first portion 102 and the flexible multi-pivot hinge cover assembly 112A, respectively.

In one example, element 306 can be manifest as a latch and element 308 can be manifest as a receiver. The latch can engage the receiver to removeably couple the first portion 102 with the flexible multi-pivot hinge cover assembly 112A. In another example, the elements 306 and 308 may magnetically couple to one another in a manner that can be overcome by the user to separate the first portion from the flexible multi-pivot hinge cover assembly 112A. Other quick attach/detach assemblies 304 are contemplated. Note further that alternatively or additionally to mechanically coupling the flexible multi-pivot hinge cover assembly 112A to the first and/or second portions 102 and 104, the quick attach/detach assembly 304 can detachably electrically couple electronic components of the first and second portions. For instance, the quick attach/detach assembly 304 may electrically couple/decouple processor 120, storage/memory 122, and/or battery 124 from the first portion 102 to graphics processor 126 in the second portion 104.

Thus, the quick attach/detach assembly 304 can allow the user to be able to detach first portion 102 or second portion 104 to use either portion independent of the other. For example, first portion 102 may be operated as a stand-alone tablet device, and then may be attached to second portion 104 via flexible multi-pivot hinge cover assembly 112A to form a device more akin to a laptop device. A user may also be able to exchange first portion 102 or second portion 104 for application-specific devices. For example, an individual second portion may include a keyboard and/or a touchscreen. In certain scenarios, the user may attach a first touchscreen as the first portion and a second touchscreen as second portion, and utilize the device like a book. In other scenarios, a user may attach a touchscreen as the first portion and an input device, such as a keyboard and trackpad, as the second portion, and utilize the device like a laptop. Other configurations and implementations are contemplated.

Figure 4:
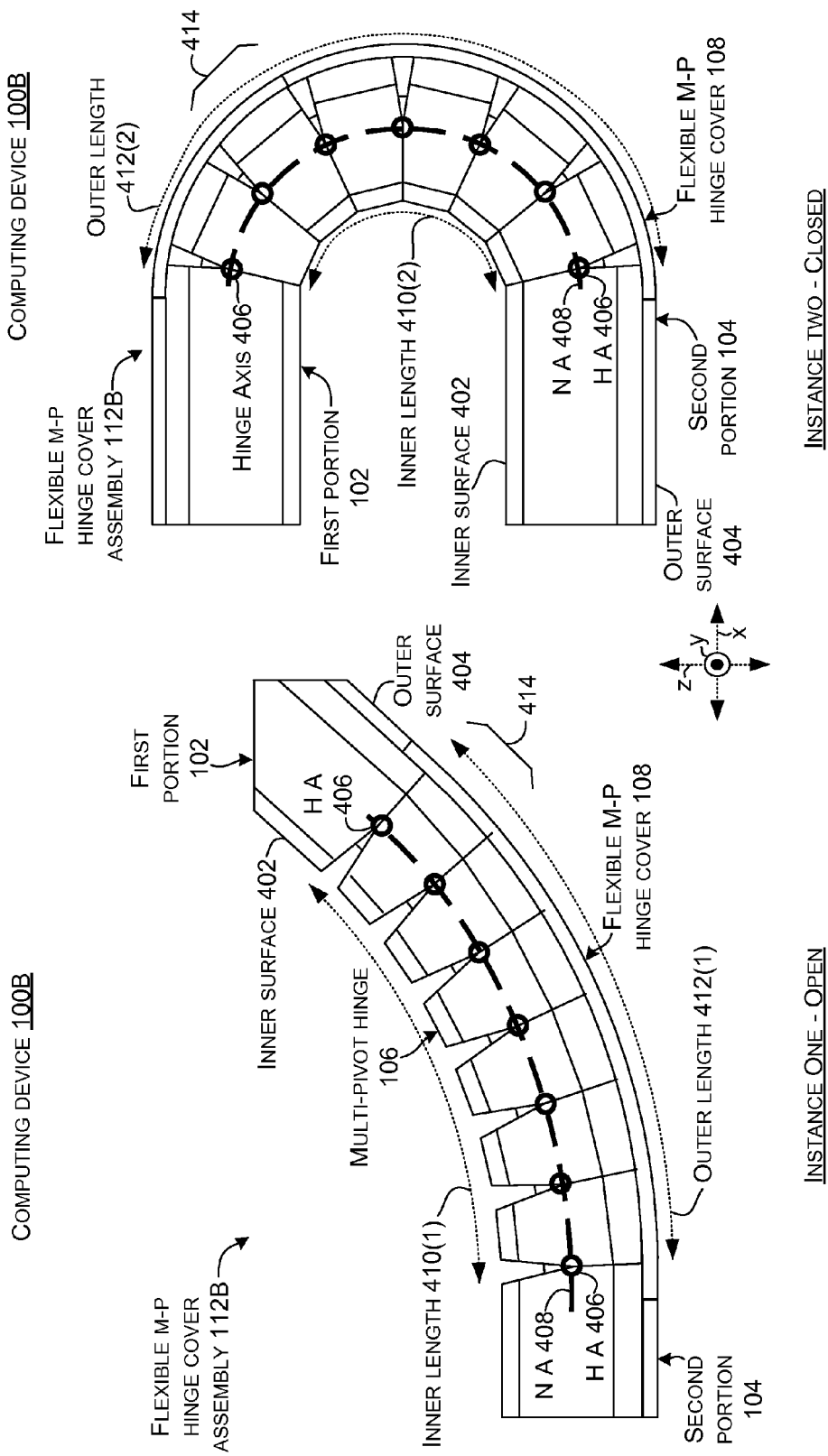
FIG. 4 shows side elevational views of another example device that is similar to the device of FIG. 1.

FIG. 4 shows side views of the flexible multi-pivot hinge cover assembly 112B that is similar to the flexible multi-pivot hinge cover assembly 112 introduced in FIG. 1. Instance One shows the flexible multi-pivot hinge cover assembly 112B in an open or deployed position and Instance Two shows a closed or storage position. For purposes of explanation the computing device 100B can be thought of as having an inner surface 402 and an outer surface 404. FIG. 4 shows hinge axes 406 (not all of which are designated) of the flexible multi-pivot hinge cover assembly 112B. A neutral axis 408 of the flexible multi-pivot hinge cover assembly 112B passes through (e.g., is defined by) the hinge axes 406. As the flexible multi-pivot hinge cover assembly 112B is rotated between the open position and the closed position the length of the neutral axis remains relatively constant. However, an inner hinge length 410 (measured at the inner surface 402) and an outer hinge length 412 (measured at the outer surface 404) can change as the position changes. For example, in the closed position of Instance Two, the inner length 410(2) is shorter than the inner length 410(1) in the open position of Instance One. In contrast, the outer length 412 increases as the flexible multi-pivot hinge cover assembly 112B is closed. For example, outer length 412(2) of Instance Two is greater than outer length 412(1) of Instance One. In some implementations, the flexible multi-pivot hinge cover can stretch or otherwise expand to accommodate the increase in length. In some cases, the flexible multi-pivot hinge cover can be stretchable such that it can be stretched to accommodate the longer closed position and then return to its original configuration and appearance when the multi-pivot hinge is opened.

Note that from one perspective, the multi-pivot hinge 106 can be thought of as a collection or set of hinge axes 406 interposed between hinge unit bodies 414 (not all of which are designated with specificity to avoid clutter on the drawing page). In some implementations, the hinge unit bodies 414 can be manifest as regular geometric shapes (when viewed along the y reference axis). For instance, in the illustrated configuration of FIG. 4, the hinge unit bodies can approximate a portion of a trapezoid. Though not specifically discussed below, in the illustrated configuration of FIG. 5, the hinge unit bodies 414 can approximate a portion of a rectangle. In these implementations the hinge unit bodies are all the same shape. In other implementations, the hinge unit bodies can have different shapes from one another.

Figure 5:
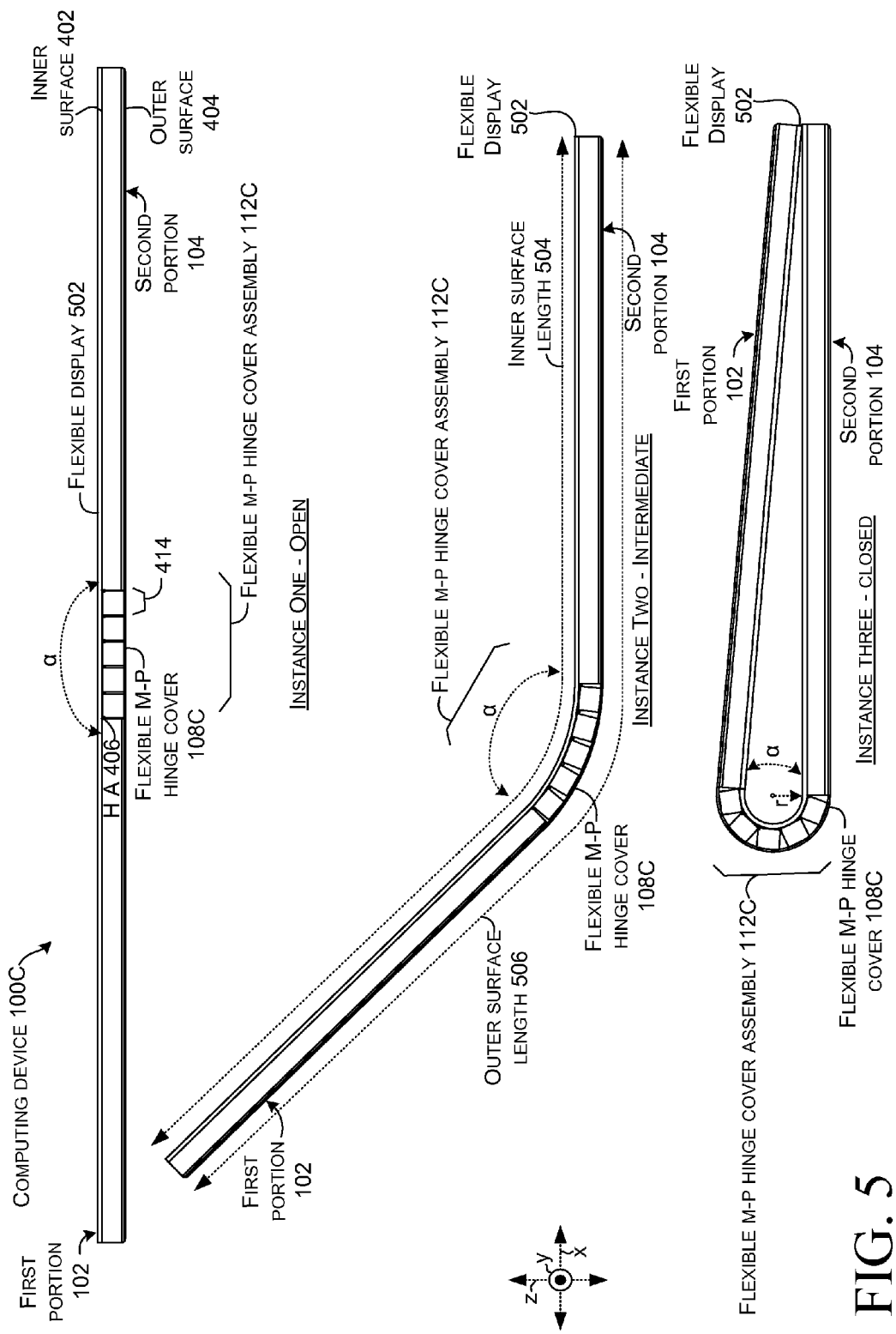
FIG. 5 shows side elevational views of another example device that includes a flexible multi-pivot hinge cover assembly example in accordance with some implementations of the present concepts.

FIG. 5 shows three views of an alternative computing device 100C. Instance One shows the computing device in an open position. Instance Two shows the computing device in an intermediate position and Instance Three shows the computing device in a closed position. This implementation can include a flexible display or flexible display screen 502 positioned on inner surface 402. Various flexible display technologies, such as flexible organic light emitting diode (OLED) or electronic paper, can be utilized.

From one perspective, the first portion 102, the multi-pivot hinge cover assembly 112C, and the second portion 104 can collectively define inner surface 402 and opposite outer surface 404 of the computing device 100C. The multi-pivot hinge cover assembly 112C can be configured to maintain a length 504 of the inner surface 402 during rotation of the first and second portions 102 and 104 while accommodating changes in length 506 of the outer surface 404 during the rotation. (The inner surface length 504 and the outer surface length 506 are only designated relative to Instance Two due to space constraints on the drawing page of FIG. 5.)

Note that the flexible multi-pivot hinge cover assembly 112C can allow the first and second portions 102 and 104 to be rotated through a range of rotations. In this implementation, the closed position of Instance Three orients the first and second portions at an angle α of approximately zero degrees to one another. (In this case, the closed position is actually less than zero degrees since zero degrees would entail the first portion being juxtaposed over and parallel to the second portion. Note also, that even in the closed position of Instance Three, the flexible multi-pivot hinge cover assembly 112C can maintain a minimum bend radius r which can protect the flexible display 502 from damage, such as creasing.) Instance Two shows the two portions 102 and 104 rotated to a typical use position for notebook (e.g., laptop) type devices where the angle α is an obtuse angle. Instance One shows a 'flat' configuration where angle α is about 180 degrees. This position can be used in an e-reader scenario. In some configurations, for example, in which flexible display 502 is capable of stretching in plane or is otherwise mechanically free to float or move on first portion 102, second portion 104, and/or the hinge section in a direction perpendicular to the axis of rotation, the range of rotation can continue until the first portion is oriented under the second portion at an angle α of about 360 degrees.

Note further, that while the illustrated configuration can be utilized for relatively large devices, such as notebooks, e-readers, and smart phones, this implementation also lends itself to relatively smaller implementations, such as wearable smart devices. For instance, computing device 100C could also be implemented as a smart watch. For example, a band of the smartwatch could be attached to the second portion 104 so that the band extends into and out of the drawing page in the y and -y reference directions. The user could close the smartwatch, such as in Instance Three, when not looking at the smartwatch to protect the flexible display 502. When the user wants to view the flexible display 502, the user can open the smartwatch to the orientation of Instance One or Instance Two to have a relatively large surface area of the flexible display on a device that is relatively compact in the closed position of Instance Three. Stated another way, the combination of the flexible multi-pivot hinge cover assembly 112C and the flexible display can allow the smartwatch (or other device) to have nearly twice as much screen area as a traditional device having the same footprint as the smartwatch does in the closed configuration. Alternatively or additionally to utilizing the flexible multi-pivot hinge cover assembly 112C to couple the first and second portions 102 and 104, another flexible multi-pivot hinge cover assembly could be utilized in (or as) the band of the smartwatch.

FIGS. 6-11C offer additional details about the elements of computing device 100 while illustrating a method of manufacture of flexible multi-pivot hinge cover assembly 112.

Figure 6:
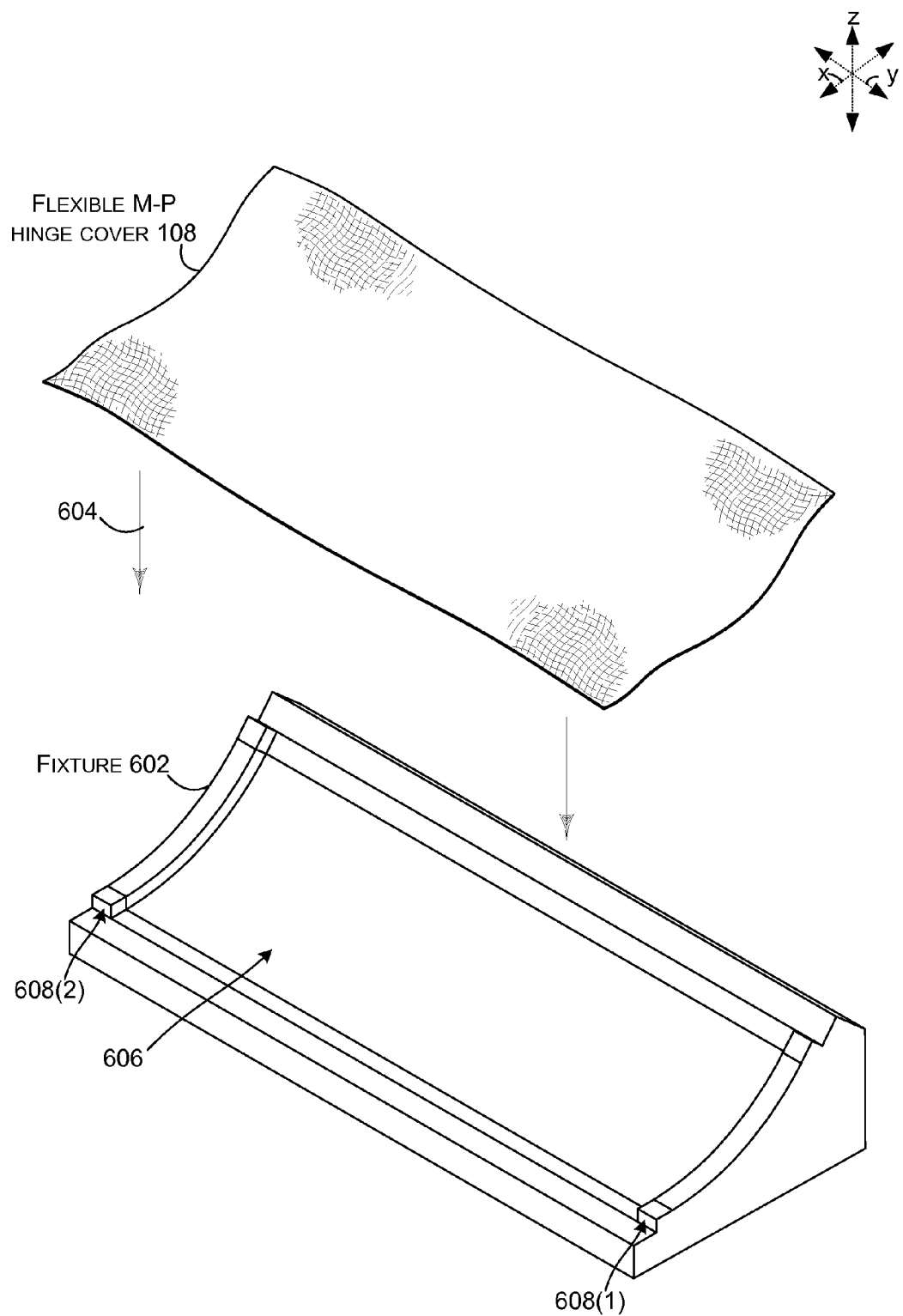

FIG. 6 shows flexible multi-pivot hinge cover 108 (actually a precursor thereof) and a fixture 602. The flexible multi-pivot hinge cover 108 can be positioned on the fixture 602 as indicated at 604. The fixture can impart a specific shape in the flexible multi-pivot hinge cover 108. For instance, in this case, the shape of the fixture as indicated generally at 606 can mimic a shape of the flexible multi-pivot hinge cover assembly 112 in the deployed position (see FIG. 1-2). In another example, the fixture can include end structures 608 that can match dimensions of the multi-pivot hinge (see FIG. 7) to hold the multi-pivot hinge and shape the flexible multi-pivot hinge cover 108.

Figure 7:
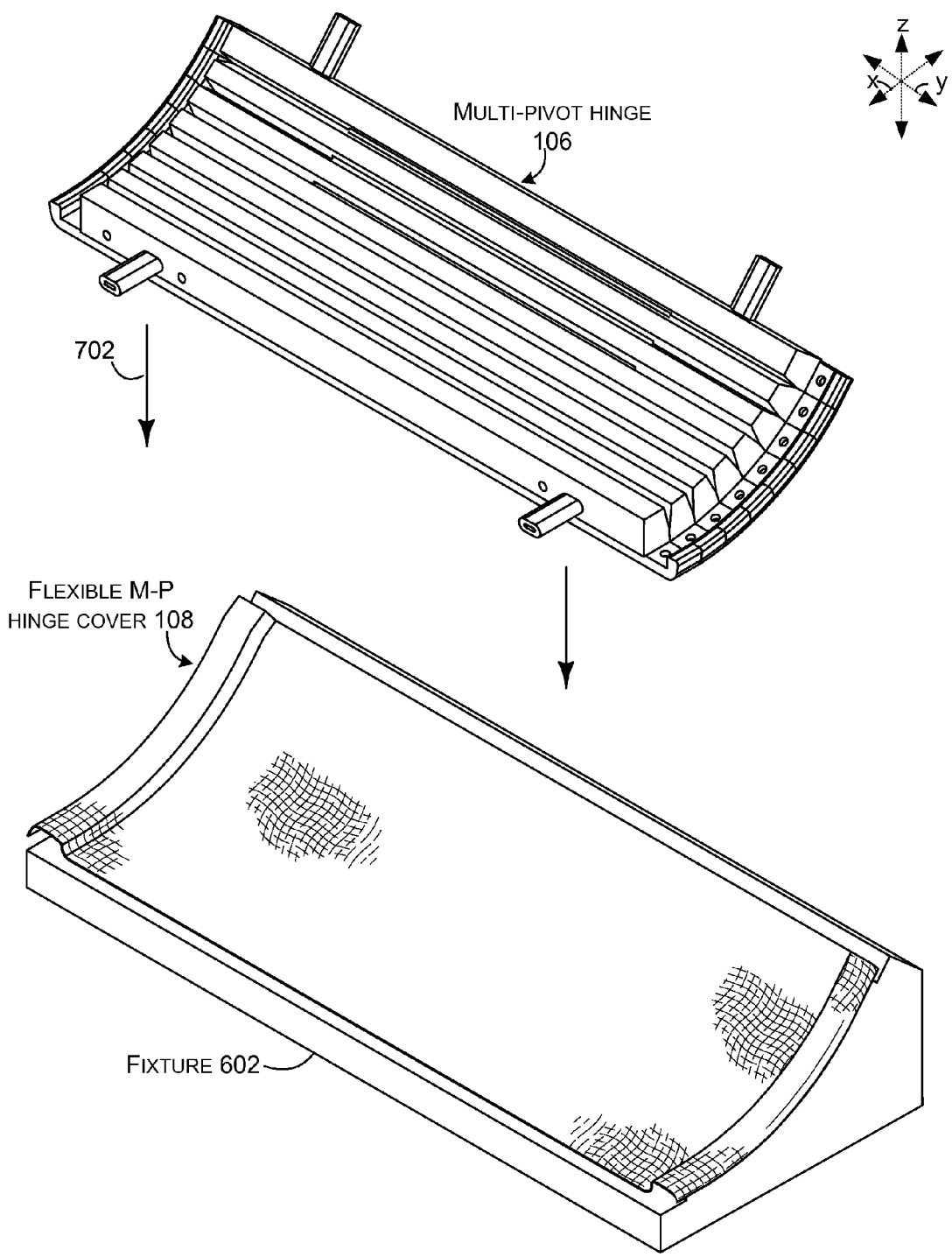
Figure 8:
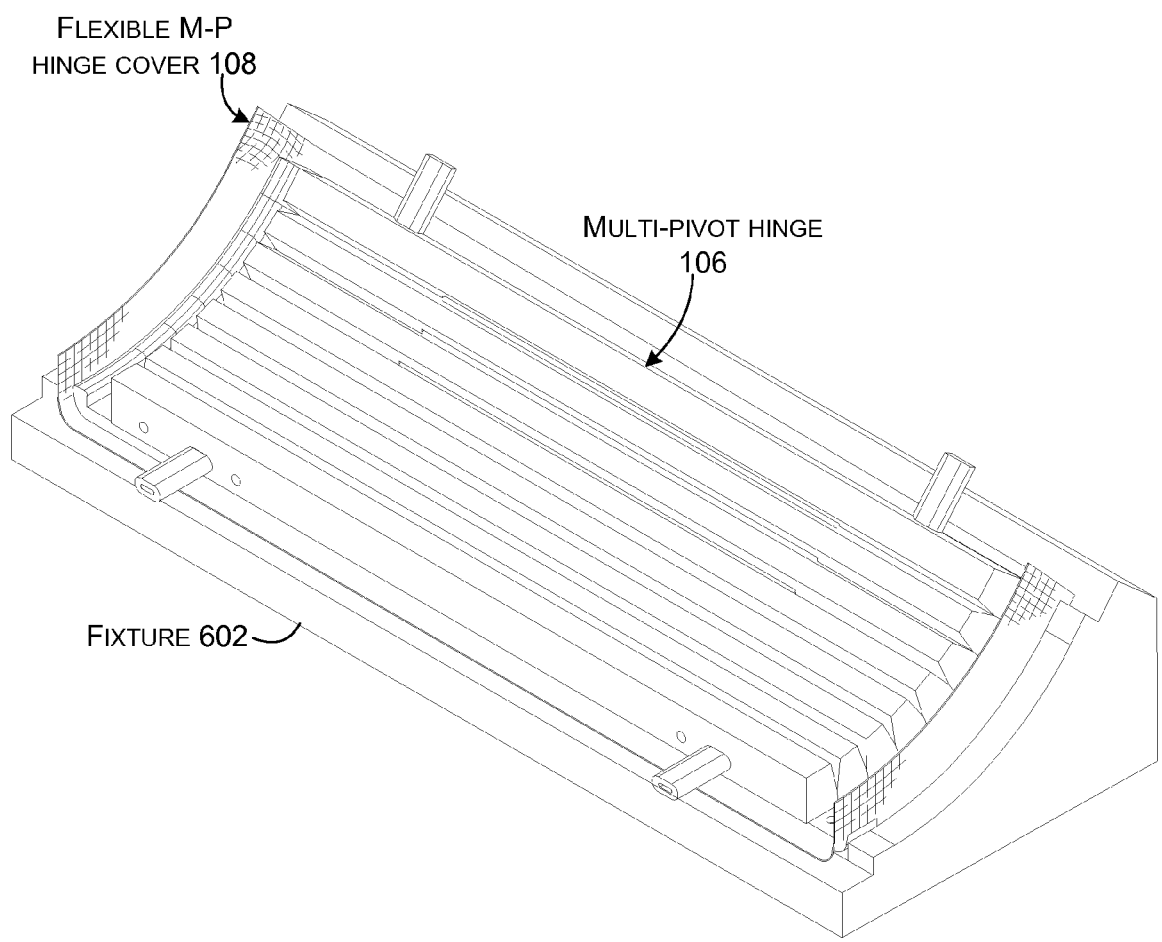

FIGS. 7-8 show that the multi-pivot hinge 106 can be positioned on the flexible multi-pivot hinge cover 108 in the fixture 602 as indicated at 702.

Figure 9:
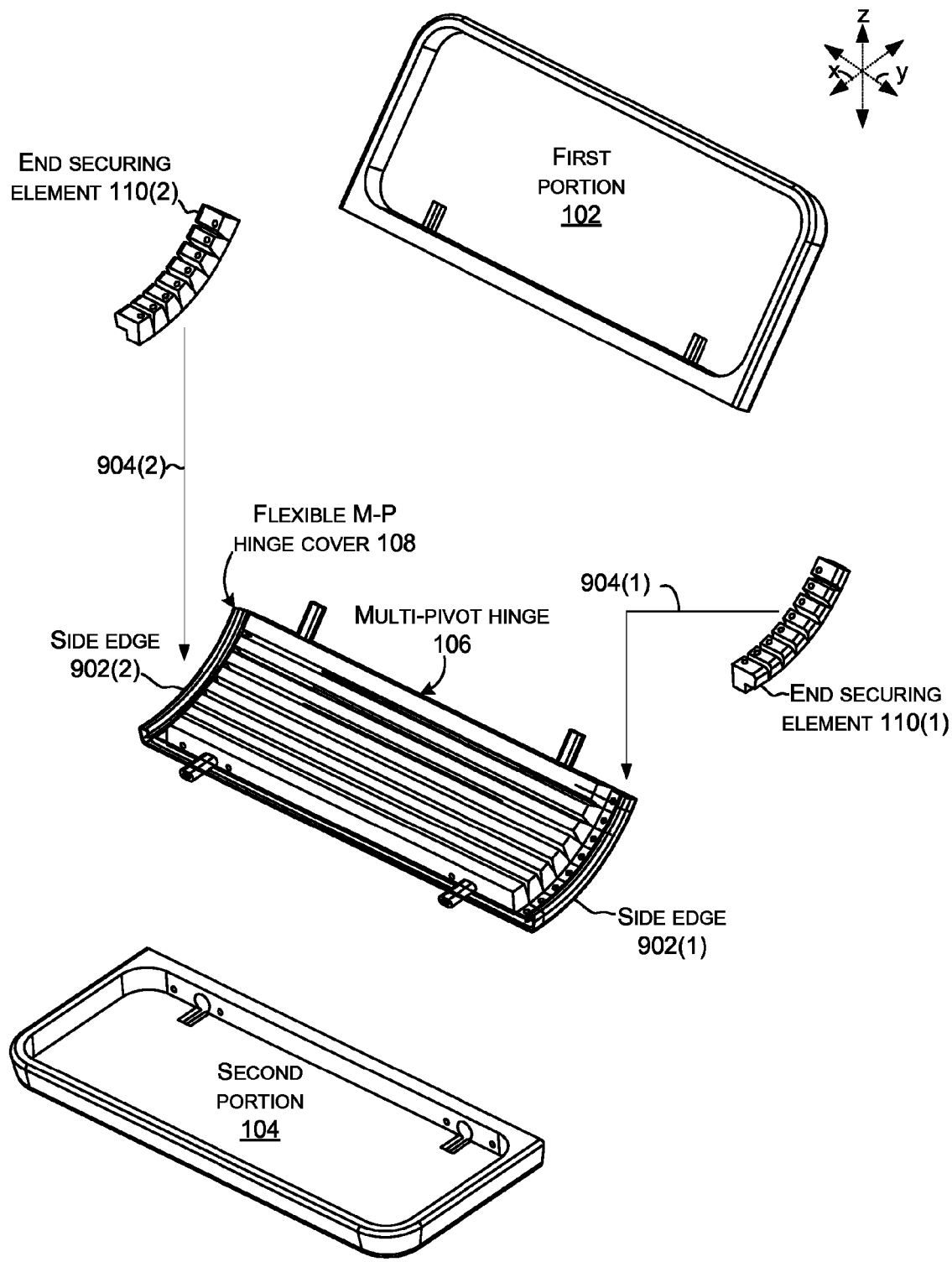

FIG. 9 shows side edges 902(1) and 902(2) of the flexible multi-pivot hinge cover 108 shaped to roll over the side edges of the multi-pivot hinge 106. The process of shaping, while not specifically shown, can be performed in various ways, such as with a fabric edge curling fixture. The shaped side edges 902 can be held in place by end securing elements 110 as indicated by arrows 904.

Figure 10:
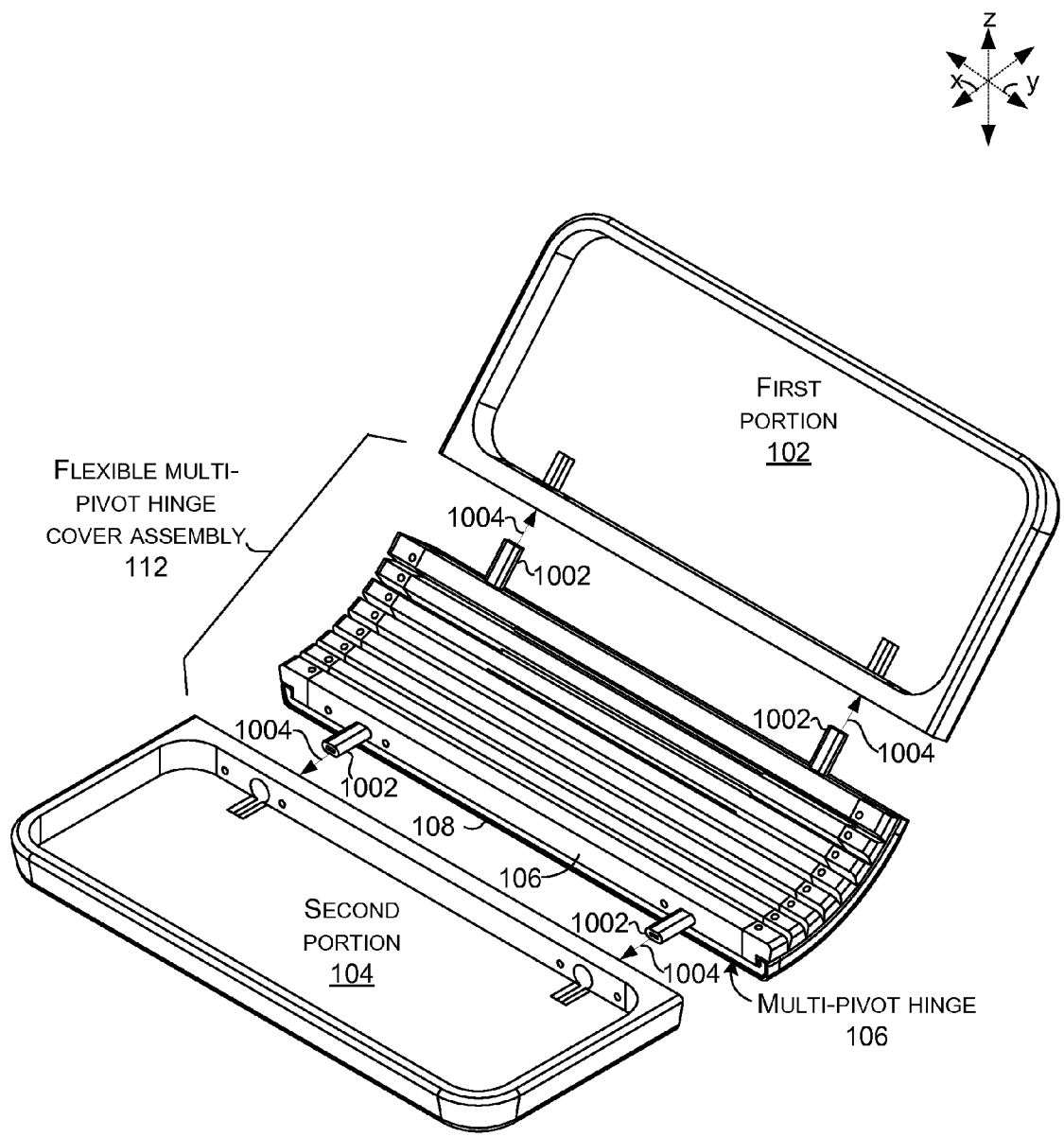

FIG. 10 shows how the ends 1002 of the multi-pivot hinge 106 can be interfaced to the first and second portions as indicated at 1004. The ends 1002 can then be secured in the first and second portions with various mechanisms, such as clamps, glue, screws, etc. The act of securing the multi-pivot hinge 106 to the first and second portions 102 and 104 can also be utilized to secure the top and bottom edges of the flexible multi-pivot hinge cover 108. For instance, the ends of the flexible multi-pivot hinge cover can be sandwiched between the first and second portions and the multi-pivot hinge 106 to complete the flexible multi-pivot hinge cover assembly 112. This aspect is shown in more detail below relative to FIGS. 11-11C.

FIG. 11 shows the computing device 100 with the first portion 102 and the second portion 104 assembled with the flexible multi-pivot hinge cover assembly 112. In this implementation, the flexible multi-pivot hinge cover 108 can be secured, at least in part, by being compressed between individual elements. For instance, FIG. 11A shows an enlarged view of how the flexible multi-pivot hinge cover 108 can be secured between the end securing element 110(1) and the multi-pivot hinge 106. In this case, the flexible multi-pivot hinge cover has been shaped so that it is secured between two different opposing surfaces of the end securing element 110(1) and the multi-pivot hinge 106. In this example the first two opposing surfaces are manifest as 1102 of the multi-pivot hinge 106 and 1104 of the end securing element 110(1). The second two opposing surfaces are manifest as 1106 of the multi-pivot hinge 106 and 1108 of the end securing element 110(1). In this implementation these two sets of different opposing surfaces 1102/1104 and 1106/1108 are oriented at approximately right angles to one another to enhance the retaining force on flexible multi-pivot hinge cover 108.

FIG. 11B shows how flexible multi-pivot hinge cover 108 can be secured between the multi-pivot hinge 106 and the second portion 104 (and similarly first portion 102). In this implementation, second portion 104 includes a protruding bearing surface 1110 that helps to ensure firm compression of the flexible multi-pivot hinge cover 108 between the multi-pivot hinge 106 and the second portion 104. The protruding bearing surface 1110 can ensure adequate compression of the flexible multi-pivot hinge cover 108 before other portions of the second portion 104 contact the multi-pivot hinge 106.

FIG. 11C shows a corner region of the flexible multi-pivot hinge cover assembly 112. The corner region can be thought of as an intersection between a portion (e.g., edge) of the flexible multi-pivot hinge cover 108 secured generally along the y reference axis between the first portion 102 and the multi-pivot hinge 106 and another portion (e.g., edge) secured generally along the x reference axis between the multi-pivot hinge 106 and the end securing element 110(1). In this corner region extra material of the flexible multi-pivot hinge cover 108 may be encountered. The end securing element 110(1) can include a void or pocket to accommodate this extra material so that the extra material does not interfere with securing the flexible multi-pivot hinge cover 108 to the computing device 100. The pocket is difficult to visualize in the line drawing of FIG. 11C, but a general location of the pocket is indicated at 1112.

FIGS. 11-11C illustrate an implementation where all edges of the flexible multi-pivot hinge cover 108 are trapped between elements of the computing device 100. This configuration can ensure that no edges of the flexible multi-pivot hinge cover 108 are exposed in a manner that can allow them to be snagged or otherwise come loose during use. This configuration can protect the user from the underlying multi-pivot hinge in a manner that is both attractive and durable.

The flexible multi-pivot hinge cover 108 can be made from various materials, such as fabrics, polymers, composites, elastomers, woven or knitted materials, skins, leathers and/or any other covering that is capable of expansion and contraction while remaining taught through the entire range of the hinge. In some implementations, a single (e.g. continuous) sheet can be utilized so that there are no seams exposed on the device (e.g. that can be seen by the user). Other elements of the flexible multi-pivot hinge cover assembly 112 can be made from various materials, such as sheet metals, die cast metals, and/or molded plastics, among others, or any combination of these materials.

Flexible multi-pivot hinge cover assembly 112 can be utilized with any type of computing device, such as but not limited to notebook computers, smart phones, wearable smart devices, and/or other types of existing, developing, and/or yet to be developed computing devices.

Example Methods

Various methods of manufacture, assembly, and use for flexible multi-pivot hinge cover assemblies are contemplated beyond those shown above relative to FIGS. 1-11C.

Additional Examples

Various examples are described above. Additional examples are described below. One example is manifest as a computing device that has a first portion that includes a display screen and a second portion that includes an input device. The example can also include a multi-pivot hinge rotatably securing the first portion and the second portion and configured to rotate around multiple hinge axes to provide rotation between the first and second portions. The example can further include a flexible multi-pivot hinge cover that covers the multi-pivot hinge between the first portion and the second portion and that is configured to accommodate length changes of the multi-pivot hinge during the rotation. The example can also include opposing end securing elements configured to secure the flexible multi-pivot hinge cover to the multi-pivot hinge between the first and second portions.

Any combination of the above and/or below examples where the display screen is a flexible display screen that extends over the first portion, the multi-pivot hinge, and the second portion.

Any combination of the above and/or below examples where a neutral axis of the multi-pivot hinge is against the flexible display screen.

Any combination of the above and/or below examples where the flexible multi-pivot hinge cover completely encloses the multi-pivot hinge or where the flexible multi-pivot hinge cover covers only an inside surface of the multi-pivot hinge or an outside surface of the multi-pivot hinge.

Any combination of the above and/or below examples where a range of rotation of the multi-pivot hinge is less than or equal to 180 degrees or wherein the range of rotation is between 180 degrees and 360 degrees.

Another example is manifest as a first portion and a second portion. The example can also include a multi-pivot hinge rotatably securing the first portion and the second portion and configured to rotate around multiple hinge axes to provide rotation between the first and second portions. The example can further include a flexible multi-pivot hinge cover that covers the multi-pivot hinge between the first portion and the second portion without any exposed edges.

Any combination of the above and/or below examples where the multi-pivot hinge is configured to rotate the first and second portions from an open orientation where the first and second portions define an obtuse angle therebetween to a closed orientation where the first portion is juxtaposed over the second portion and wherein the flexible multi-pivot hinge cover is configured to stretch in the closed orientation.

Any combination of the above and/or below examples where a first edge of the flexible multi-pivot hinge cover is secured between the first portion and the multi-pivot hinge and a second edge of the flexible multi-pivot hinge cover is secured between the second portion and the multi-pivot hinge.

Any combination of the above and/or below examples where a third edge of the flexible multi-pivot hinge cover is secured between the multi-pivot hinge and a first end securing element and a fourth edge of the flexible multi-pivot hinge cover is secured between the multi-pivot hinge and the second end securing element.

Any combination of the above and/or below examples where the flexible multi-pivot hinge cover comprises a single piece of elastic fabric.

Any combination of the above and/or below examples where the first portion, the multi-pivot hinge, and the second portion collectively define an inner surface and an opposite outer surface and wherein the multi-pivot hinge is configured to maintain a length of the inner surface during rotation of the first and second portions and wherein the flexible multi-pivot hinge cover is configured to accommodate changes in length of the outer surface during the rotation.

Any combination of the above and/or below examples where the multi-pivot hinge maintains a minimum bend radius throughout the rotation.

Any combination of the above and/or below examples further including a flexible display secured to the inner surface.

Any combination of the above and/or below examples where the multi-pivot hinge comprises multiple hinge axes interposed between multiple hinge unit bodies.

Any combination of the above and/or below examples where the hinge unit bodies are all a same shape or wherein the hinge unit bodies have different shapes.

Any combination of the above and/or below examples where the hinge unit bodies are regular geometric shapes.

Another example is manifest as a first portion and a second portion. The example can also include a flexible multi-pivot hinge cover assembly rotatably securing the first and second portions.

Any combination of the above and/or below examples where the second portion comprises a base of a smart watch.

Any combination of the above and/or below examples where the flexible multi-pivot hinge cover assembly allows the first portion to be rotated away from the second portion during use and closed upon the first portion when not in use.

Any combination of the above and/or below examples further including another flexible multi-pivot hinge cover assembly comprising a band of the smart watch.

CONCLUSION

Although techniques, methods, devices, systems, etc., pertaining to flexible multi-pivot hinge cover assemblies are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A computing device, comprising: a first portion that includes a display screen and a second portion that includes an input device; a multi-pivot hinge rotatably securing the first portion and the second portion and that rotates around multiple hinge axes to provide rotation between the first and second portions; a flexible multi-pivot hinge cover that covers the multi-pivot hinge between the first portion and the second portion and accommodates length changes of the multi-pivot hinge during the rotation; and, opposing end securing elements extending along side edges of the multi-pivot hinge from the first portion to the second portion and securing the flexible multi-pivot hinge cover to the multi-pivot hinge between L-shaped surfaces of the opposing end securing elements and coordinating L-shaped surfaces of the side edges.

2. The computing device of claim 1, wherein the display screen is a flexible display screen that extends over the first portion, the multi-pivot hinge, and the second portion.

3. The computing device of claim 2, wherein edges of the flexible multi-pivot hinge cover are compressed between the L-shaped surfaces of the opposing end securing elements and the coordinating L-shaped surfaces of the side edges.

4. The computing device of claim 1, wherein the flexible multi-pivot hinge cover completely encloses the multi-pivot hinge or wherein the flexible multi-pivot hinge cover covers only an inside surface of the multi-pivot hinge or an outside surface of the multi-pivot hinge.

5. The computing device of claim 1, wherein a range of rotation of the multi-pivot hinge is less than 180 degrees or wherein the range of rotation is between 180 degrees and 360 degrees.

6. A computing device, comprising: a first portion and a second portion; a multi-pivot hinge rotatably securing the first portion and the second portion and rotating around multiple hinge axes to provide rotation between the first and second portions; a flexible multi-pivot hinge cover that covers the multi-pivot hinge between the first portion and the second portion; and, opposing end securing elements extending along side edges of the multi-pivot hinge, the opposing end securing elements having a notched inner surface that accommodates the rotation of the multi-pivot hinge, edges of the flexible multi-pivot hinge cover being secured between opposing surfaces of the computing device such that the edges are not exposed.

7. The computing device of claim 6, wherein the multi-pivot hinge rotates the first and second portions from an open orientation where the first and second portions define an obtuse angle therebetween to a closed orientation where the first portion is juxtaposed over the second portion and wherein the flexible multi-pivot hinge cover is stretched in the closed orientation.

8. The computing device of claim 6, wherein a first edge of the flexible multi-pivot hinge cover is secured between first opposing surfaces of the first portion and the multi-pivot hinge, and a second edge of the flexible multi-pivot hinge cover is secured between second opposing surfaces of the second portion and the multi-pivot hinge.

9. The computing device of claim 8, wherein a third edge of the flexible multi-pivot hinge cover is secured between third opposing surfaces of the multi-pivot hinge and a first end securing element and a fourth edge of the flexible multi-pivot hinge cover is secured between fourth opposing surfaces of the multi-pivot hinge and a second end securing element.

10. The computing device of claim 6, wherein the flexible multi-pivot hinge cover comprises a single piece of elastic fabric.

11. The computing device of claim 6, wherein the first portion, the multi-pivot hinge, and the second portion collectively define an inner surface and an opposite outer surface and wherein the multi-pivot hinge maintains a length of the inner surface during rotation of the first and second portions and wherein the flexible multi-pivot hinge cover accommodates changes in length of the outer surface during the rotation.

12. The computing device of claim 11, wherein the multi-pivot hinge maintains a minimum bend radius throughout the rotation.

13. The computing device of claim 12, further comprising a flexible display secured to the inner surface.

14. The computing device of claim 6, wherein the multi-pivot hinge comprises multiple hinge axes interposed between multiple hinge unit bodies.

15. The computing device of claim 14, wherein the hinge unit bodies are all a same shape or wherein the hinge unit bodies have different shapes.

16. The computing device of claim 14, wherein the multiple hinge axes align with notches of the notched inner surface of the opposing end securing elements.

17. A computing device, comprising: a first portion and a second portion; a multi-pivot hinge rotatably securing the first and second portions; a flexible multi-pivot hinge cover; and, opposing end securing elements extending along side edges of the multi-pivot hinge, edges of the flexible multi-pivot hinge cover positioned between opposing L-shaped surfaces of the opposing end securing elements and the side edges of the multi-pivot hinge.

18. The computing device of claim 17, wherein the first portion or the second portion includes a display screen.

19. The computing device of claim 18, wherein the multi-pivot hinge allows the first portion to be rotated away from the second portion during use and closed upon the first portion when not in use.

20. The computing device of claim 17, further comprising a wearable smart device.

* * * * *